Figure 1:
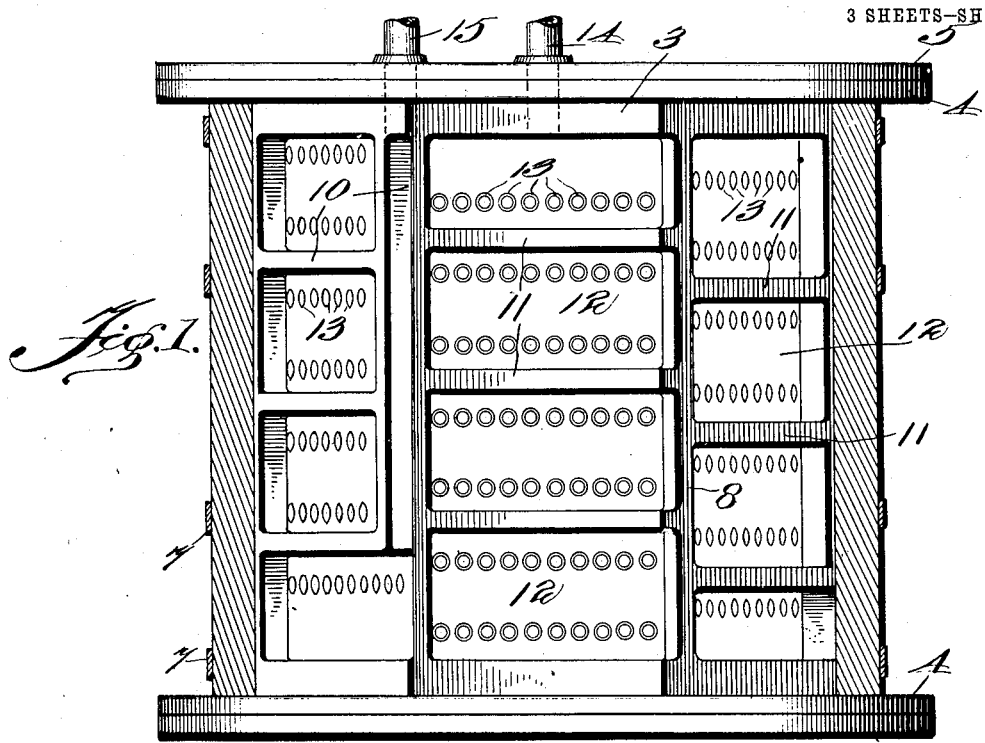

L. A. CARTER, J. C. JONES & J. C. SPOTTS.
HEATING OR COOLING APPARATUS.
APPLICATION FILED JUNE 23, 1911.

1,024,554.

Patented Apr. 30, 1912.

3 SHEETS—SHEET 1.

L. A. CARTER, J. C. JONES & J. C. SPOTTS.
HEATING OR COOLING APPARATUS.
APPLICATION FILED JUNE 23, 1911.
1,024,554.
Patented Apr. 30, 1912.
3 SHEETS—SHEET 2.
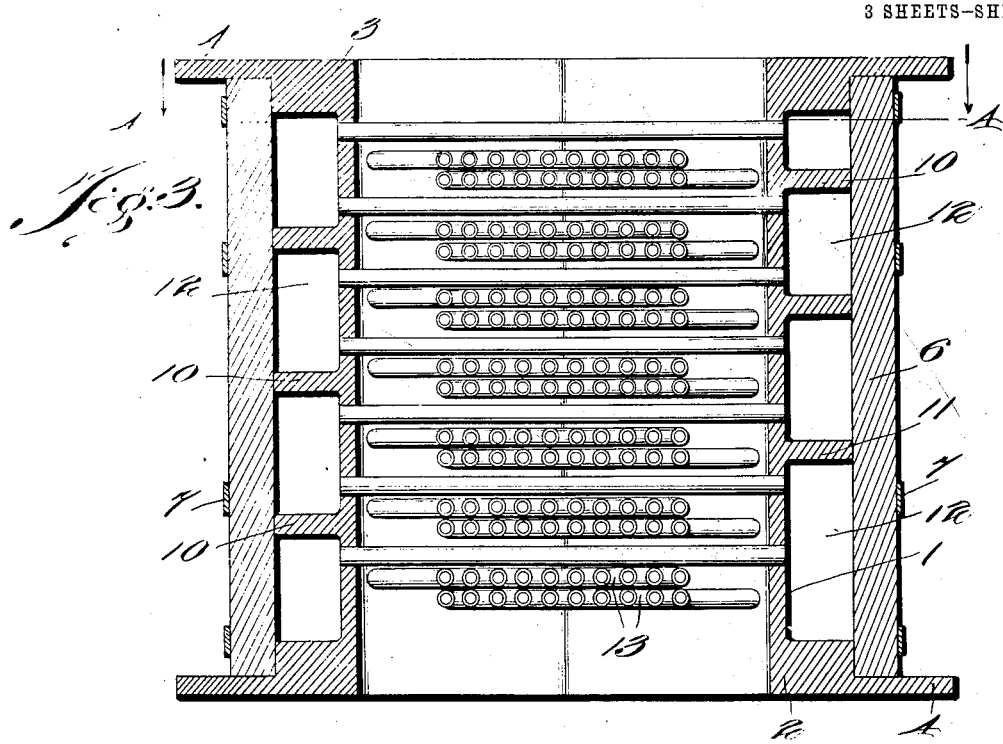
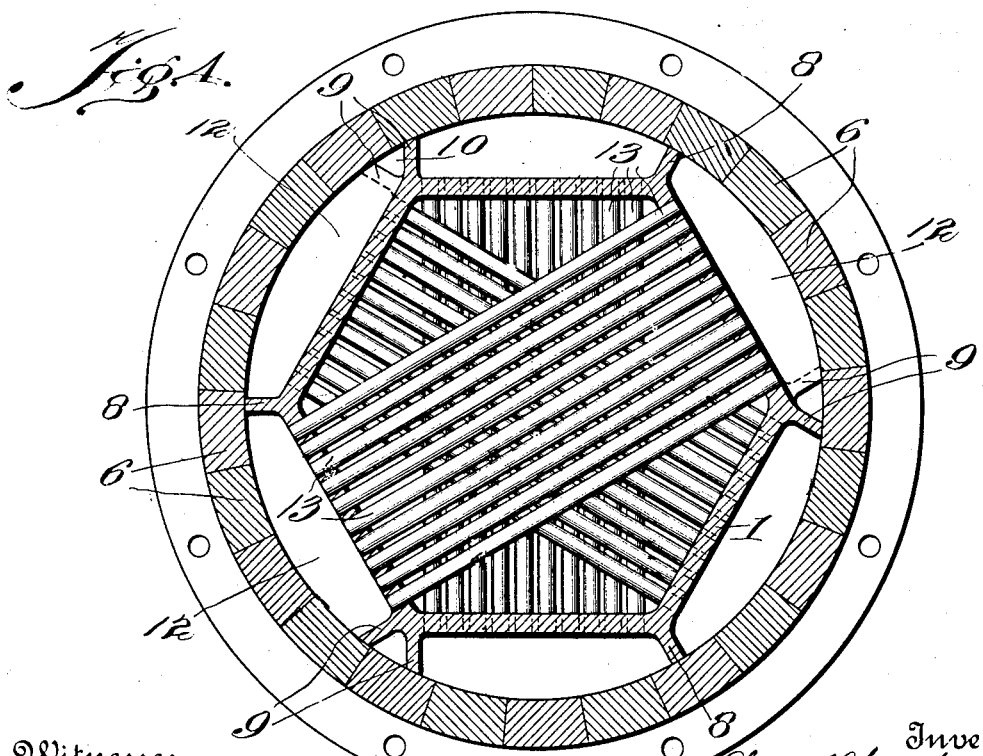

L. A. CARTER, J. C. JONES & J. C. SPOTTS.
HEATING OR COOLING APPARATUS.
APPLICATION FILED JUNE 23, 1911.

1,024,554.

Patented Apr. 30, 1912.

3 SHEETS—SHEET 3

Witnesses

Inventors
Samuel Alexander Carter
James Cornelius Jones
James Campbell Spotts
Attorney

UNITED STATES PATENT OFFICE.

LEMUEL A. CARTER, JAMES CORNELIUS JONES, AND JAMES C. SPOTTS, OF NEW ORLEANS, LOUISIANA.

HEATING OR COOLING APPARATUS.

1,024,554.  Specification of Letters Patent.  Patented Apr. 30, 1912.

Application filed June 23, 1911. Serial No. 634,986.

*To all whom it may concern:*

Be it known that we, LEMUEL A. CARTER, JAMES C. JONES, and JAMES C. SPOTTS, citizens of the United States, residing at New Orleans, in the parish of Orleans and State of Louisiana, have invented certain new and useful Improvements in Heating or Cooling Apparatus; and we do hereby declare the following to be a full, clear, and exact description of the invention, such as will enable others skilled in the art to which it appertains to make and use the same.

The present invention relates to heating or cooling apparatus of the tubular boiler type, and has for its purpose to provide an apparatus of that character wherein the liquid to be treated is more effectively subjected to the heating or cooling influences of the medium employed, and for a relatively greater period during its passage through the apparatus than has been heretofore proposed.

The invention has for its further object to present a construction wherein the series of tubes for the passing liquid are more rigidly secured within the boiler or shell than are the tubes of other apparatus of this general character thereby prolonging the life of the tubes and increasing the efficiency of the apparatus as a whole.

With these and other objects in view the invention consists in the arrangement and combination of parts hereinafter claimed, and while the invention is not restricted to the exact details shown and described, still for the purpose of disclosure reference is had to the accompanying drawings, in which like reference characters designate the same parts in the several views, and in which:—

Figure 2:
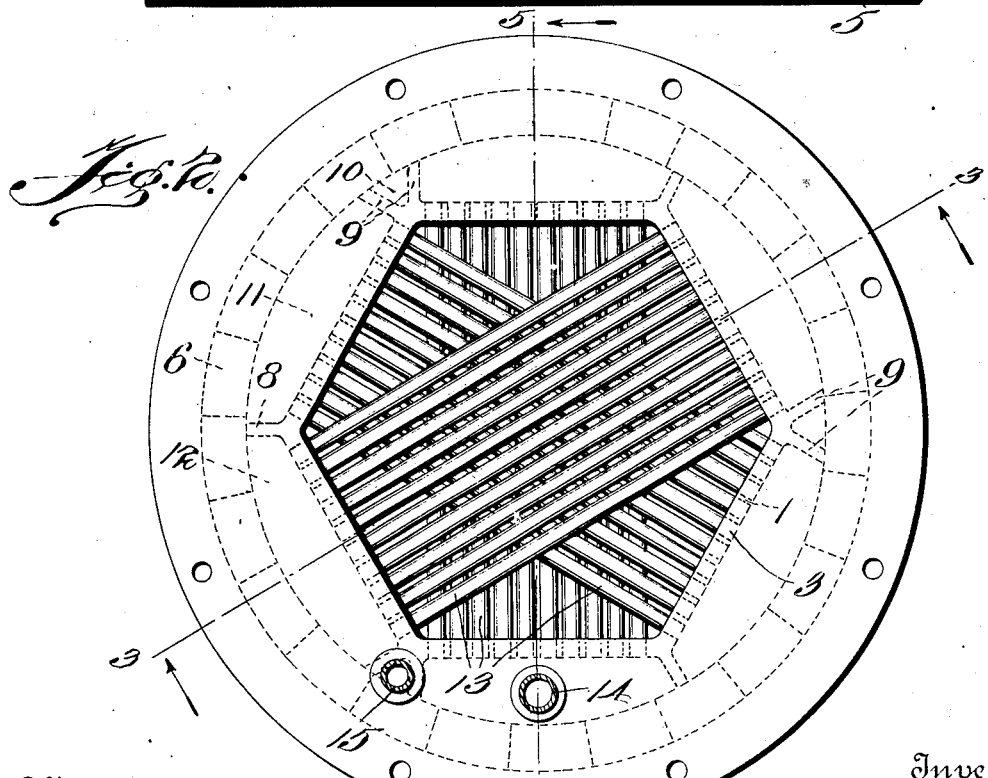
Figure 5:
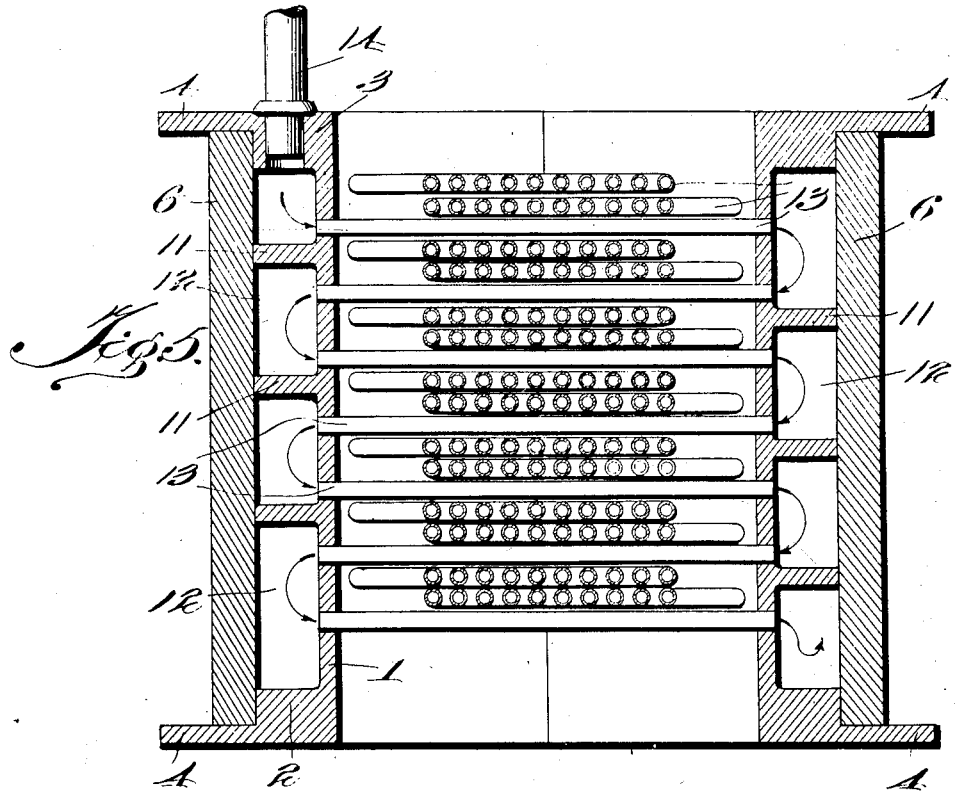
Figure 6:
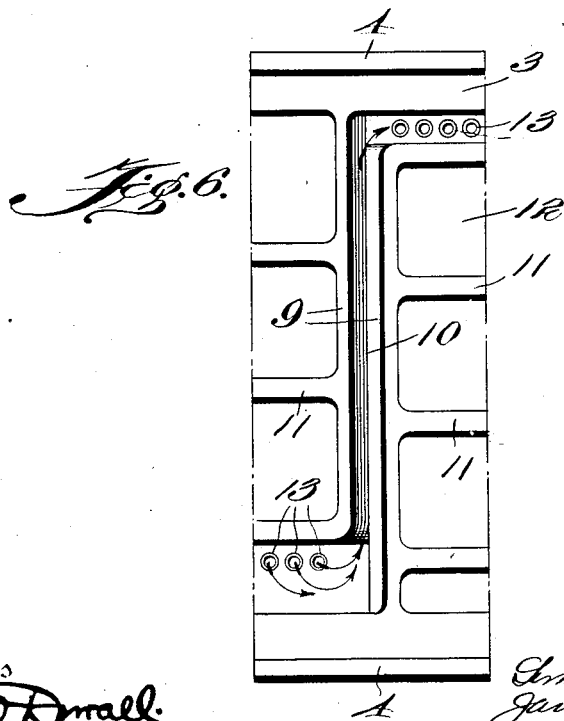

Figure 1 is a side elevation of the apparatus with the cylinder in section. Fig. 2 is a top plan view thereof with the cover plate removed, and showing the design of shell employed. Fig. 3 is a central vertical sectional view taken on the line 3—3 of Fig. 2. Fig. 4 is a transverse sectional view taken on the line 4—4 of Fig. 3, and looking in the direction of the arrows. Fig. 5 is a central vertical section of the apparatus illustrating the direction of flow of the fluid, and Fig. 6 is a detail, partly in elevation and section, showing the means for conducting the fluid from one series of chambers to another.

Referring to the construction in further detail wherein like reference characters indicate corresponding parts in the different views shown, the apparatus consists of a shell 1 which is of substantially hexagonal design in cross section, and which at opposite ends is constructed with heads 2 and 3 that have each an annular extended portion 4 to which the end or closure plates 5 are secured, and providing annular shoulders. A cylinder or outer casing for the shell 1, and consisting of a plurality of wooden staves 6, is secured to said shell through the medium of a plurality of hoops or bands 7 which hold the staves assembled and against the heads of the shell in the manner illustrated in Fig. 3.

The shell 1 is provided with a plurality of radially disposed ribs or flanges 8 and 9 that are located on and lengthwise of said shell at the point of meeting of the sides thereof. Said flanges meet flush against the inner surface of the cylinder and provide therewith a plurality of closed compartments which will be presently referred to. The ribs 9 are arranged alternately with the ribs 8 and are disposed in pairs and in relative angular relation. Each pair of ribs 9 provides, with the inner face of the cylinder, a channel or water passageway 10 substantially V-shaped in cross section, and whose purpose is to conduct the circulating fluid from one series of chambers to the next adjacent series (see Fig. 6) as will be presently described. Between each pair of radial ribs 8 and 9 there is provided a plurality of longitudinal or segmental ribs 11 which with said radial ribs divide the compartments into a plurality of liquid chambers 12. Said chambers 12 are arranged in groups or series, of which there is one series to each side of the hexagonal shell and the chambers of the different series are arranged in staggered relation. The individual chambers 12 of each series are isolated from each other, and the lowermost chamber of each series communicates with the uppermost chamber of the next adjacent series to the right by means of the passageway or channel 10 as above pointed out.

Located within the shell 1 is a plurality of pipes or tubes 13 arranged in groups or parallel series as illustrated and secured within the sides of the shell in any appropriate manner. The tubes of each horizontal group are secured within opposite parallel sides of the shell 1, by which arrangement the ends of all the tubes have uniform and square bearings as distinct from non-uniform and angular bearings as is the case with securing the tubes in a cylindrical shell in apparatus of this character. The tubes are arranged to bring each chamber 12 of one series into communication with two chambers of the diametrically opposite series so that (see Figs 3 and 5) a flow of liquid will be from the inlet pipe 14 into one chamber, through a group of pipes into a lower chamber on the opposite side of the shell; from this chamber through another set of tubes into a lower chamber of the opposite series and so on across all of the tubes in the same vertical series and through all of the tubes on opposite sides of the shell. At the end of this course, i. e. when the fluid enters the lowest or bottom chamber of one side it passes into the uppermost chamber of the next adjacent side to the right. From this point the fluid takes precisely that course just described, and in like manner it flows through all of the chambers and finally passes off through the outlet pipe 15.

While in the drawings the shell is shown with its cross-section in the form of a hexagon, which is the preferred construction, it will be obvious that its form may be in the shape of any polygon having oppositely disposed parallel faces. The advantage of this polygonal arrangement is that the tubes may be made of equal length, whereas with tubes crossing a cylindrical shell, the lengths would vary.

It is obvious that those skilled in the art may vary the details of construction and arrangement of parts without departing from the spirit of our invention, and therefore we do not wish to be limited to such features except as may be required by the claims.

What we claim is:—

1. In a water heating or cooling apparatus, the combination of a cylinder; a shell located within said cylinder and spaced therefrom; ribs on said shell providing series of chambers, the chambers of each series being disposed in straight alinement and arranged in staggered relation with respect to the chamber of the next adjacent series; tubes passing through the shell and connecting opposite sides of said chambers; and means for conveying liquid to and causing the same to traverse said chamber and tubes and drawing off said liquid, substantially as described.

2. In a water heating or cooling apparatus, the combination of a cylinder; a polygonal sided shell located within said cylinder and spaced therefrom; ribs on each of the sides of said shell providing a series of chambers disposed in straight alinement, the chambers of each of said series being arranged in staggered relation with respect to the chambers of the next adjacent series; tubes passing through the shell and secured to opposite parallel sides thereof, and connecting opposite alternate pairs of said chambers; and means for conveying liquid to and causing the same to traverse all of said chambers and tubes, and drawing off the liquid, substantially as described.

3. In a water heating or cooling apparatus, the combination of a cylinder; a polygonal sided shell located within said cylinder and spaced therefrom; radially disposed ribs on said shell arranged lengthwise thereof; longitudinal ribs connecting said radial ribs and forming series of chambers therewith, the chambers of one of said series being disposed in straight alinement and arranged in staggered relation with respect to the chambers of the next adjacent series; tubes arranged in parallel series passing through the shell and secured to the opposite parallel sides thereof, and connecting opposite alternate pairs of said chambers; and means for conveying the liquid to and causing the same to traverse all of said chambers and tubes, and drawing off the liquid, substantially as described.

4. In a water heating or cooling apparatus, the combination of a cylinder; a polygonal sided shell located within said cylinder and spaced therefrom; radially disposed ribs on said shell located at the meeting edges of said sides and disposed lengthwise therewith, some of said ribs arranged in pairs and providing liquid passageways; longitudinal ribs connecting said radial ribs and providing series of liquid chambers therewith; the chambers of each of said series disposed in straight alinement and arranged in staggered relation with respect to the chambers of the next adjacent series; tubes arranged in parallel series passing through the shell and secured to opposite parallel sides thereof, and connecting opposite alternate pairs of said chambers; and means for conveying liquid to and causing the same to traverse all of said chambers, passageways and tubes, and drawing off the liquid, substantially as described.

5. In a water heating or cooling apparatus, the combination of a cylinder; a polygonal sided shell located within said cylinder and spaced therefrom; radially disposed ribs on said shell located at the meeting edges of said sides and disposed lengthwise therewith; some of said ribs arranged in close angular relation and providing liquid passageways; longitudinal ribs connecting said radial ribs and providing series of liquid chambers therewith; the chambers of each of said series disposed in straight alinement and arranged in staggered relation with respect to the chambers of the next adjacent series; tubes arranged in parallel series passing through the shell and secured to opposite parallel sides thereof, and connecting opposite alternate pairs of said chambers; and means for conveying liquid to and causing the same to traverse all of said chambers, passageways, and tubes, and drawing off the liquid, substantially as described.

6. In a water heating or cooling apparatus, the combination of a cylinder; a hexagonal shell located within said cylinder and spaced therefrom; radially disposed ribs on said shell located at the meeting edges of said sides and disposed lengthwise therewith; the ribs on the alternate meeting edges of said shell arranged in close angular relation and providing liquid passageways; longitudinal ribs connecting said radial ribs and providing series of liquid chambers therewith; the chambers of each of said series disposed in straight alinement and arranged in staggered relation with respect to the chambers of the next adjacent series; said angularly disposed pairs of tubes being cut-away at either end to afford communication with the lower chamber of one series with the upper chamber of the next adjacent series; tubes arranged in parallel series passing through the shell and secured to opposite parallel sides thereof, and connecting opposite alternate pairs of said chambers; and means for conveying liquid to and causing the same to traverse all of said chambers, passageways, and tubes, and drawing off the liquid, substantially as described.

7. In a water heating or cooling apparatus, the combination of a metallic hexagonal shell having a head at either end thereof; a cylinder comprising staves and hoops securing said staves to the shell heads; radially disposed ribs secured to said shell along the meeting edges of the sides thereof; the ribs of the alternate meeting edges disposed in close angular relation and providing liquid passageways; longitudinal ribs connecting said radial ribs and providing series of liquid chambers therewith; the chambers of each of said series disposed in straight alinement and arranged in staggered relation with respect to the chambers of the next adjacent series; said angularly disposed pairs of ribs being cut-away at either end to afford communication with the lower chamber of one series with the upper chamber of the next adjacent series; tubes arranged in horizontal series passing through said shell and secured to opposite parallel sides thereof, said tubes connecting a chamber of one series with two adjacent chambers of the opposite series; and means for conveying liquid to and causing the same to traverse all of said chambers, passageways, and tubes, and drawing off the liquid, substantially as described.

In testimony whereof, we affix our signatures, in presence of two witnesses.

LEMUEL A. CARTER.
JAMES CORNELIUS JONES.
JAMES C. SPOTTS.

Witnesses.
W. J. MARION,
J. W. KAISER.